(12) United States Patent
Herman, Jr.

(10) Patent No.: US 11,828,347 B2
(45) Date of Patent: Nov. 28, 2023

(54) INTEGRATED SOFT SHACKLE WITH NOTCHED BUTTON

(71) Applicant: Edward J. Herman, Jr., Annapolis, MD (US)

(72) Inventor: Edward J. Herman, Jr., Annapolis, MD (US)

( * ) Notice: Subject to any disclaimer, the term of this patent is extended or adjusted under 35 U.S.C. 154(b) by 0 days.

(21) Appl. No.: 17/544,424

(22) Filed: Dec. 7, 2021

(65) Prior Publication Data

US 2022/0252136 A1    Aug. 11, 2022

Related U.S. Application Data

(60) Provisional application No. 63/122,351, filed on Dec. 7, 2020.

(51) Int. Cl.
 *F16G 11/04*    (2006.01)
 *F16G 11/14*    (2006.01)
 *A44B 1/18*    (2006.01)

(52) U.S. Cl.
 CPC .............. *F16G 11/046* (2013.01); *A44B 1/18* (2013.01); *F16G 11/14* (2013.01)

(58) Field of Classification Search
 CPC ....... F16G 11/046; F16G 11/14; F16G 11/146
 See application file for complete search history.

(56) References Cited

U.S. PATENT DOCUMENTS

| 1,569,303 | A | * | 1/1926 | Regan | F16G 11/046 24/129 B |
|---|---|---|---|---|---|
| 1,613,635 | A | * | 1/1927 | Zimmerlund | F16G 11/14 24/129 B |
| 1,714,770 | A | * | 5/1929 | Finn | F16G 11/143 24/129 R |
| 3,238,585 | A | * | 3/1966 | Froyd | F16G 11/14 24/129 B |
| 4,939,820 | A | * | 7/1990 | Babcock | F16G 11/046 24/129 B |
| 2017/0334533 | A1 | * | 11/2017 | Herman | B63H 9/10 |
| 2019/0234487 | A1 | * | 8/2019 | Cole | B66C 1/12 |

* cited by examiner

*Primary Examiner* — Robert Sandy
(74) *Attorney, Agent, or Firm* — SOFER & HAROUN, LLP (57) ABSTRACT

A button is provided, for use in a soft shackle in a rope. The button is made of a material equal to or exceeding the strength of the rope. The button has a notch and an oval. The notch and oval form a bar. The bar is dimensioned in size to not deform when the button is under a load equal to the strength of the rope.

6 Claims, 9 Drawing Sheets

INTEGRATED SOFT SHACKLE WITH NOTCHED BUTTON

RELATED APPLICATION

This application claims the benefit of priority from U.S. Provisional Application No. 63/122,351, filed on Dec. 7, 2021, the entirety of which is incorporated by reference.

FIELD OF THE INVENTION

The present invention is directed to a soft shackle to be used on lines and ropes. More particularly, the present invention relates to using a notched button made of high strength material for making a soft shackle that is integrated at the bitter end of a line or rope, and methods for making and tying the integrated soft shackle.

PRIOR ART

Over the course of history, man has used rope to perform many tasks such as tying items together, pulling items, domesticating animals, or for the simple joy of a swing. Over the years, man developed different knots to tie a rope to an object or to itself. In the field of sailing alone, there are hundreds of different knots used to tie lines to sails, spars, anchors, chains, and the like. Note, the word "line" is proper term for a rope onboard a boat while the term "rope" is commonly used on land.

Figure 1A:
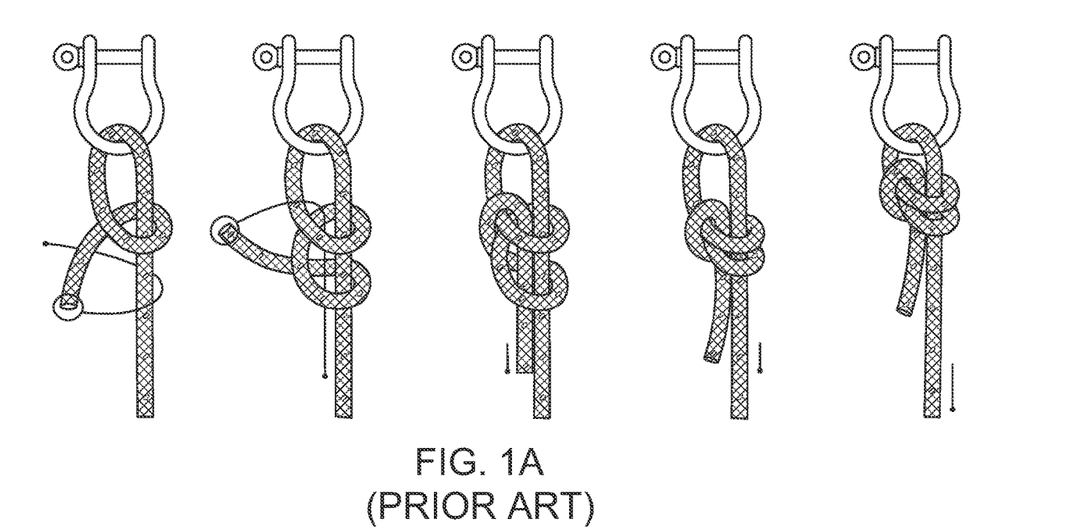

For example, FIG. 1A is an illustration of a prior art halyard knot which is often used to attached the top of a sail to a line used to pull the sail up a mast. The halyard knot is known to be of reasonable strength for the purpose of pulling a sail up a mast and holding it there. However, a haylyard knot can be very difficult to untie, is weaker than the strength of the rope or line, and can fail when under heavy loads.

Figure 1B:
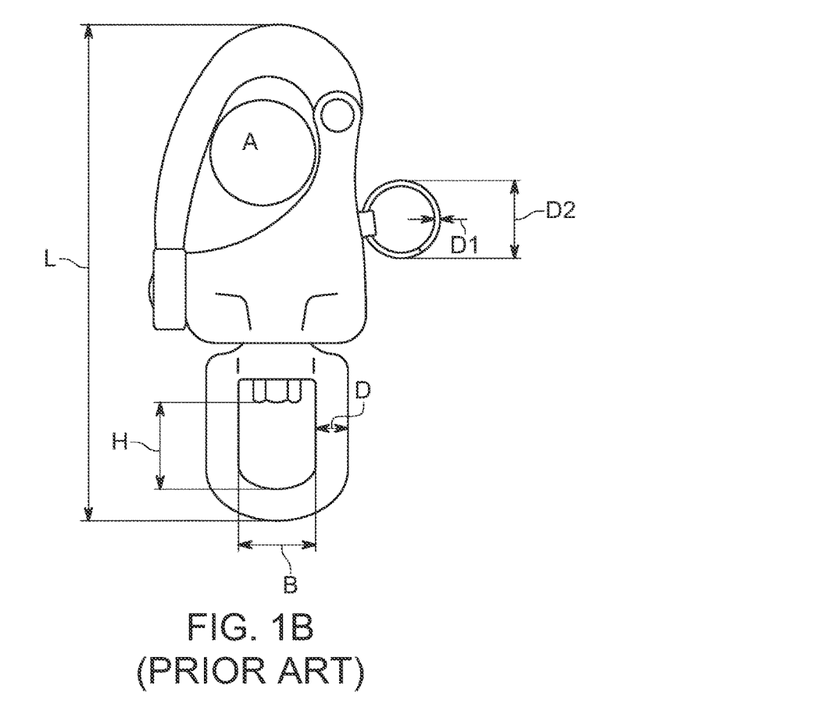

FIG. 1B is an illustration of a prior art stainless steel shackle which can be used instead of a knot. The advantages of using a shackle is that they are usually stronger than knots and can be easily opened by pulling or unscrewing their center pins. The disadvanges of using a shackle is that it is hard and heavy, can cause injury if it strikes a person, and when overloaded it can distort in shape and become difficult or impossible to open.

Figure 1C:
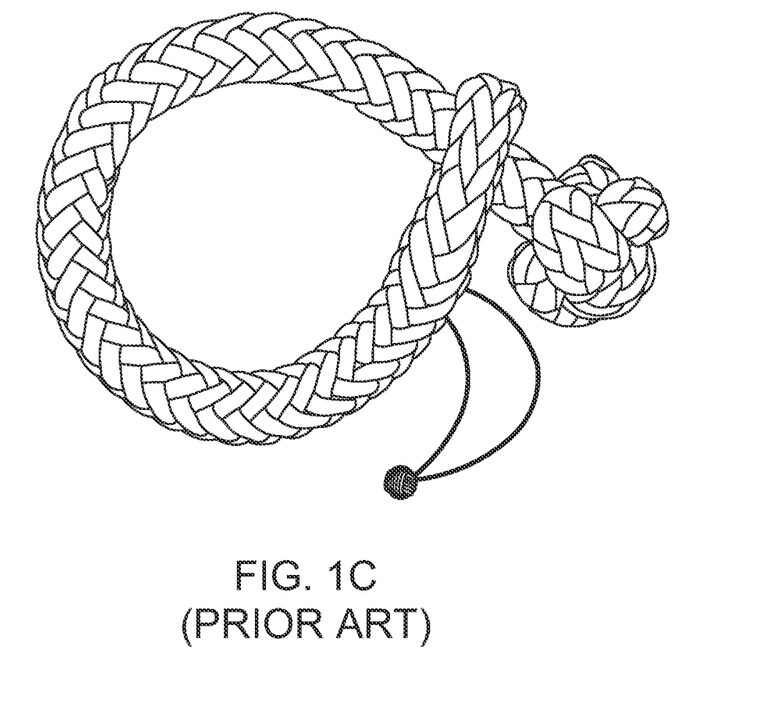

FIG. 1C is an illustration of a prior art soft shackle which is simply a high strength line with a spliced loop at one end and a knot at the other. The advantages of a soft shackle are that it is light, relatively easy to make, and easy to use. The disadvantage of a soft shackle is that it can accidently come undone, it is weaker than the line itself, and it can fail when overloaded. For example, many soft shackles are made using braided line manufactured from Ultra High Molecular Weight Polyethylene ("UHMWPE") materials like Dyneema®. Such lines are slippery and soft shackle knots will slip out if not properly preloaded before use.

Figure 1D:
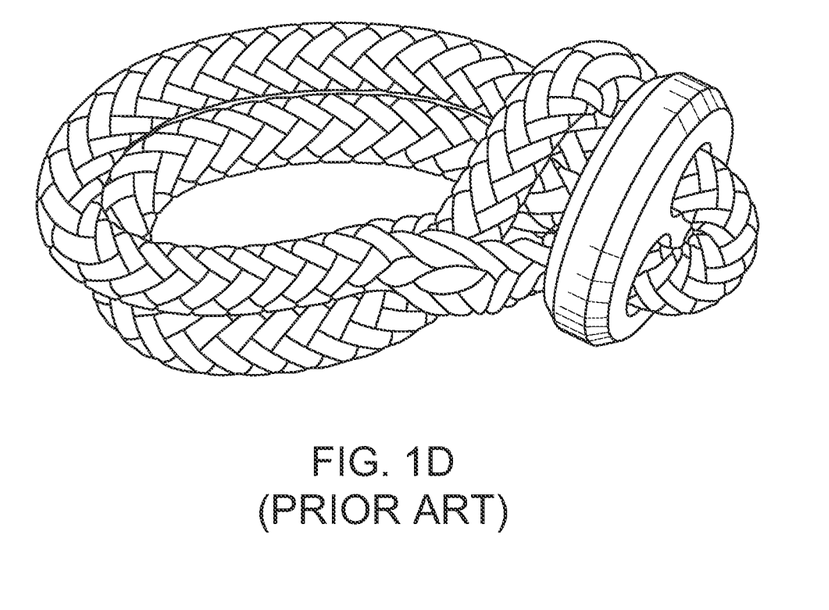
Figure 2:
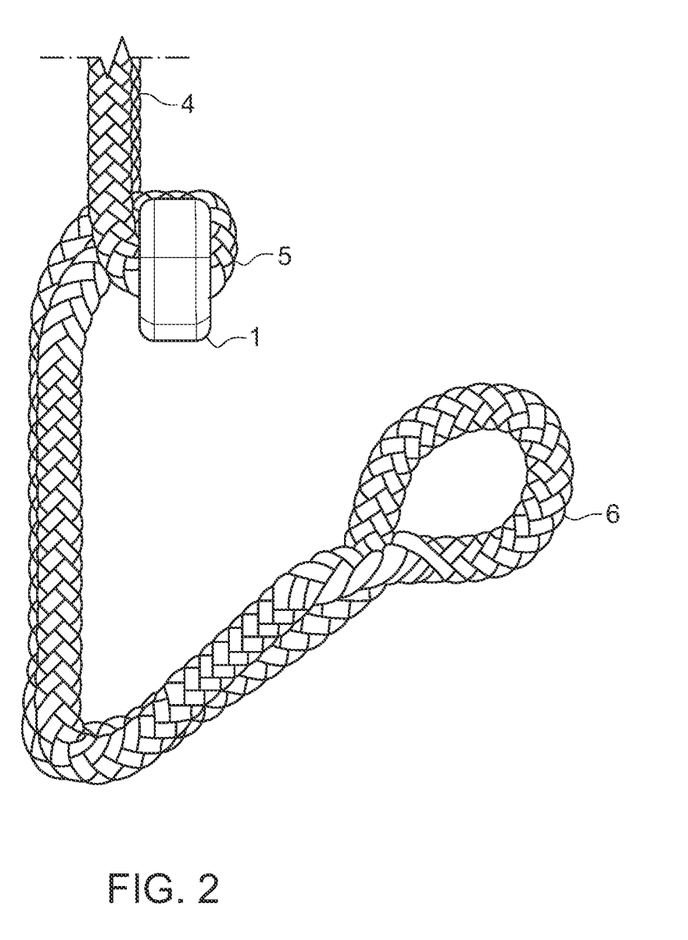
FIG. 2 is a side view illustration of the notched button integrated into the end of a line or rope to form a integrated soft shackle in the open position.

FIG. 1D is an illustration of a prior art soft button shackle that uses an aluminum botton instead of a knot which greatly increases the strength of the shackle and its ability to stay closed compared to a simple knot. A known disadvange of using a button soft shackle is that it is not integrated into the end of a line. As such, it becomes difficult to attach the soft button shackle to the end of a line or rope in a manner that maintains the strength and integrity of the attachment.

SUMMARY OF THE INVENTION

The present invention provides a notched button made of high strength material to be used to form a soft button shackle that is integrated into the bitter end of a line or rope. Such a notched botton can be used to form an integrated soft shackle that is strong, safe, and reliable. Moreover, the present invention is light in weight and does not diminish the strength of the rope or line. The present invention as described below integrates a soft shackle into the end of the line by using the end of the line itself, which is not possible with prior art designs. Additionally the present invention does not easily snag on other items near rigging or other objects.

As such the present arrangement provides for a button, for use in a soft shackle in a rope. The button is made of a material equal to or exceeding the strength of the rope. The button has a notch and an oval. The notch and oval form a bar. The bar is dimensioned in size to not deform when the button is under a load equal to the strength of the rope.

The present arrangement also provide for a method of making a soft shackle by making a first loop in a rope such that the loop fits around a bar formed between a notch and an oval of a notched button. A noose is made in the rope that can cinch around the notched button, making a second loop that fits around the bar. The end of to rope is spliced back into the rope.

The present arrangement also provides for method of using a soft shackle with a rope having a button attached thereto and a noose at the end of the rope. The method includes opening the noose wide enough to slip over the button, placing the noose over the button, and cinching the noose tight around the button.

BRIEF DESCRIPTION OF THE DRAWINGS

The present invention can be best understood through the following description and accompanying drawing, wherein:
FIGS. 1A-D are illlustrations of the prior art.

DETAILED DESCRIPTION

Applicants begin by reciting the element number for ease in assiting with identitying such elements in FIGS. 2-7:
1. Notched button.
2. Oval hole
3. Notch
4. Braided high strength fiber rope or line
5. First Loop
6. Noose
7. Second Loop
8. Splice
9. Bar of the notched button having a length L, width W, and depth D.

As described in more detail below, a notched button 1 is woven or spliced into a rope 4. Together an oval hole 2 and a notch 3 create a bar 9 that a first loop 5 and a second loop 7 of rope 4 wrap around. Bar 9 is sized so rope 4, when passed around it, does not lose strength.

In one embodiment, the notched button 1 has edges that are rounded or smoothed over, so rope 4 is not chafed or cut when a noose 6 is cinched over notched button 1. Notched button 1 is preferably disc shaped and made from high strength material, for example aerospace grade 7075 aluminum (AA7075), such that the strength of notched button 1 meets or exceeds the strength of rope 4 and thus does not deform when loads are applied that exceed the breaking strength of rope 4.

Figure 6:
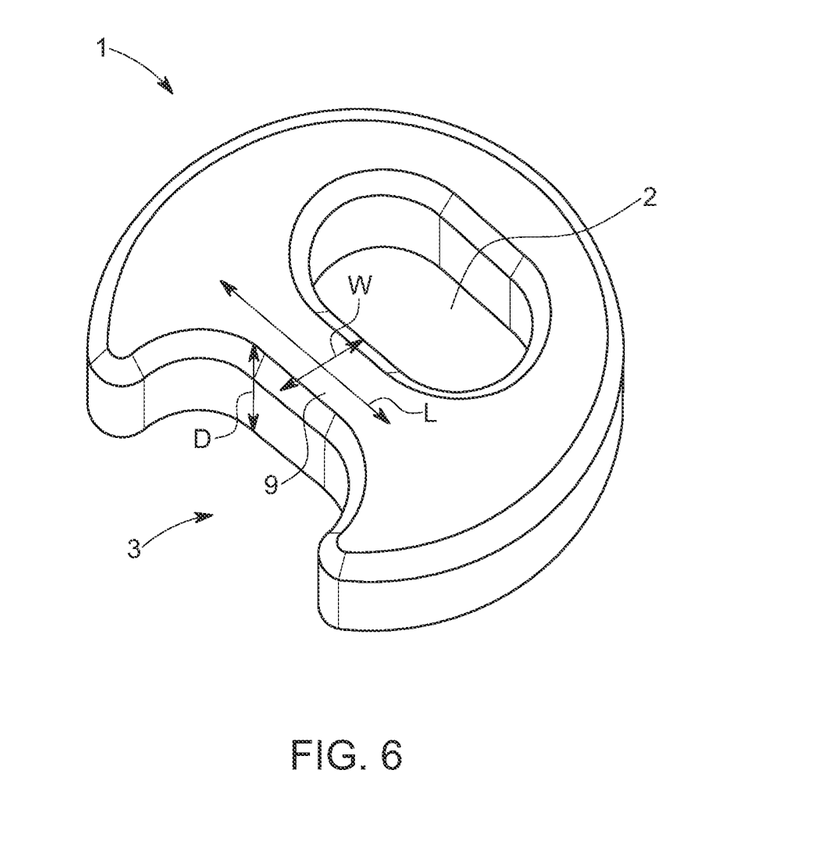
FIG. 6 is isometric top view of the notched button.

It is important that bar 9 of notched button 1 is dimensioned to a minimal length and diameter that will work, strength wise, based on the diameter (gauge) of rope 4 used to for first and second loops 5 and 7. In a preferred embodiment, a length L of bar 9 as illustrated in FIG. 6 is equal to abouth twice (2×) the diameter of rope 4. Length L could be longer, for example 2.1× the dismater of rope 4, or somewhat smaller, for example, 1.9× the diameter of rope 4, and still function. For example, a rope with a 5 mm diameter would require a bar length L of approximately 10 mm. It is also important to maximize the surface contact area between first and second loops 5 and 7 and bar 9. If the surface contact area is too small, bar 9 will cut rope 4, or distort bar 9, and the shackle will fail. If the surface area is too large the button may still work, but it will be too big and bulky for practical use.

For example, using an 8 mm rope 4 with a specified 5 mm core diameter (actual diameter of approximately 5.7 mm +/−), the overall diameter of button 1 would be about 25.5 mm with a preferred depth D of bar 9 of 9.5 mm and a preferred width W of 7.5 mm. That size allows notched button 1 to have a minimal profile while at the same time yield a sufficient contact surface between bar 9 and first and second loops 5 and 7 to avoid breaking the line or distorting bar 9. In this embodiment, the ratio of the cross sectional area of bar 9 (width W×depth D) to the cross sectional area of the core of rope 4 is preferably no less than 2.75 and no greater than 3.25. The ratio of the cross sectional contact area of bar 9 to the contact surface area of rope 4 is preferably no less than 1.25 and no greater than 3.25.

In another example, using a 10 mm rope 4 with a specified 8 mm core diameter (actual diameter 8.2 mm +/−), the overall diameter of buttom 1 would be approximately 35 mm with a preferred depth D of the bar at 11.1 mm and a preffered width W of the the bar at 11.1 mm. With a larger diameter rope 4, the ratio of the cross sectional area of bar 9 to the cross sectional area of the core of rope 4 is preferably no less than 2.25 and no greater than 3.25. The ratio of the contact areas (bar/rope) is preferably no less than 1.25 and not greater than 3.25.

Figure 8:
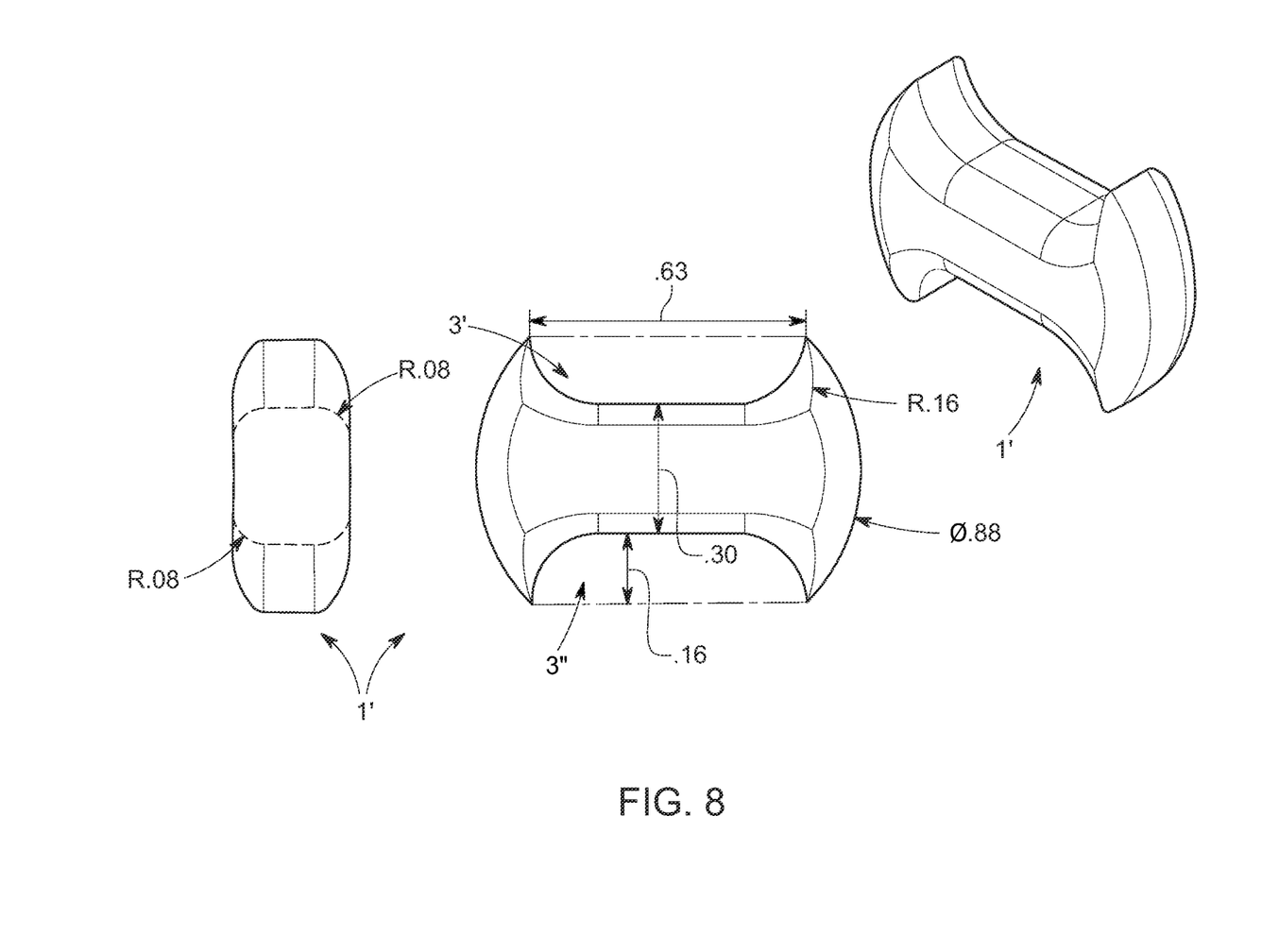
FIG. 8 shows an alternate double notched embodiment of the button.

In another embodiment as illustrated in FIG. 8, it is contemplated that instead of having oval 2 and notch 3, the button 1' can have two notches 3' and 3" on either side providing approximately the same function and strength for the single notched button 1 with oval center.

As will be apparent to those skilled in the art, the required contact surface area is a function the strength of the materials used to manufacture notched button 1 and the strength of rope 4.

Initial testing of the the invention has demonstrated that the strength of the integrated soft shackle exceeds the strength of the rope. For example, using a 5 mm single braid UHMWPE Dyneema® line 4 from New England Ropes with a rated breaking strength of 6,050 pounds, the integrated soft shackle failed at loads ranging from 6,200 pounds to as high as 6,340 pounds, with the failure occurring at noose 6.

It will be readily apparent to those skilled in the art that there are many ways to manufacture notched button 1. For example, one could take a rod of high strength aerospace grade aluminum having the approximate desired diameter of button 1, cut off a section of the rod to form a disc of the approximate desired thickness, and use a CDC machine to cut out oval 2 and notch 3, forming bar 9, and machine round off all of the edges. It is preferred that the surface of such an aluminum button 1 be anodized to further smooth the surface, for example, using a hard coat of MIL-A 8625 Type III Class 2 anodize.

Figure 7:
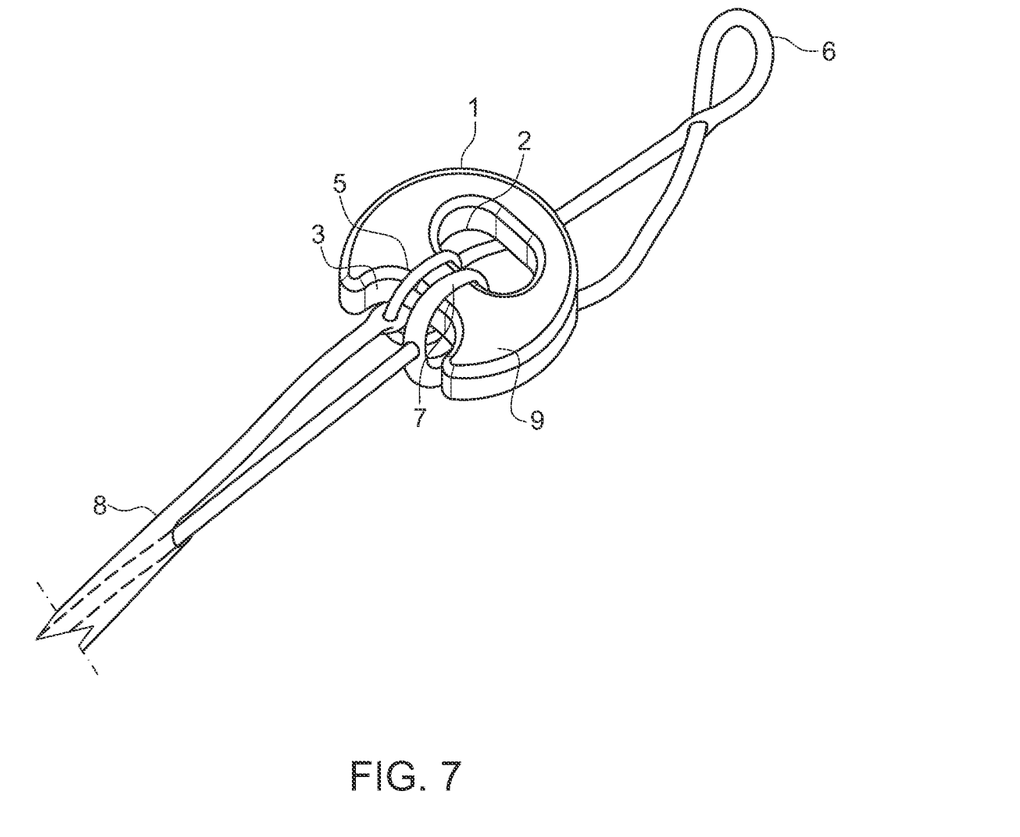
FIG. 7 shows the soft shackle and a line or rope, in the process of being tied.

Once button 1 is made it is fairly easy for one skilled in the art to integrate button 1 with line or rope 4. With reference to FIG. 7, take a length of rope 4 and wrap it around bar 9 and pass it through the center of the rope to create first loop 5 around bar 9. Rope 4 is then passed again through the center of the rope to form noose 6. Rope 4 is then wrapped around bar 9 again and passed through the center of the rope to form second loop 7 around bar 9. Rope 4 is then spliced back to itself using a standard splice.

Figure 3:
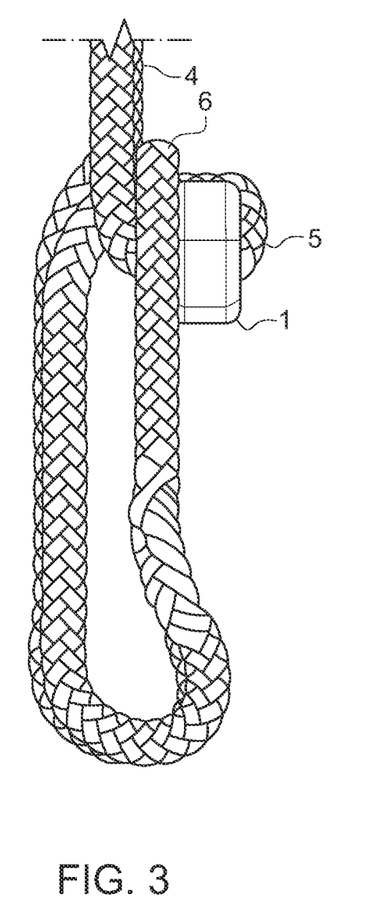
FIG. 3 is a side view illustration of the integrated soft shackle in the closed position.
Figure 4:
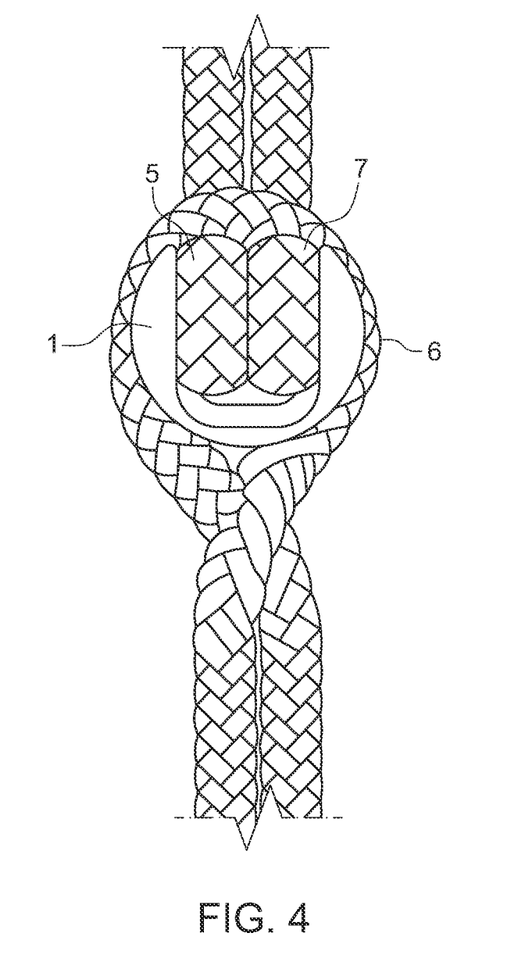
FIG. 4 is a top view illustration of the soft shackle in the closed position.
Figure 5:
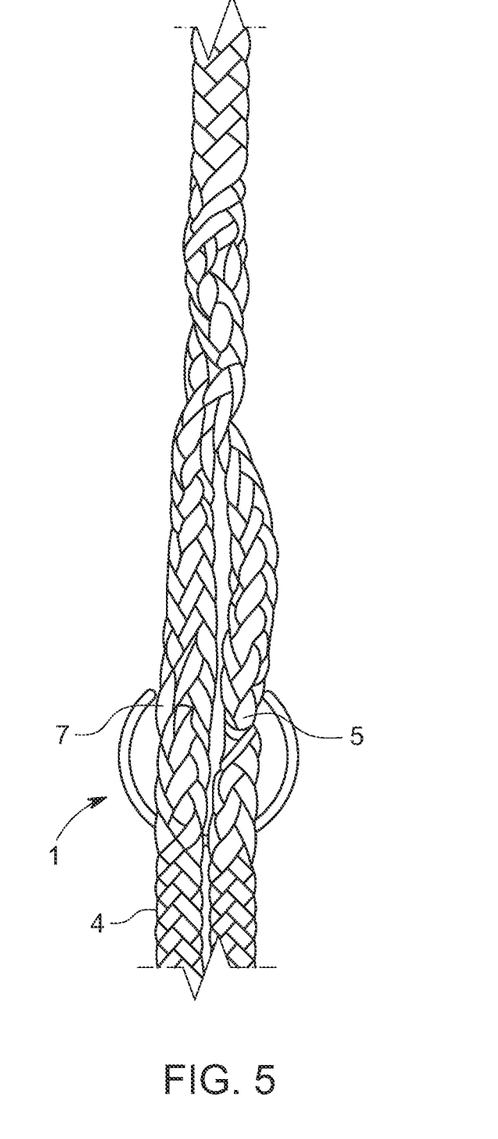
FIG. 5 is a bottom view illustration of the soft shackle in the open position.

Once the integrated soft shackle is made its method of use is simple. Place noose 6 over notched button 1 and cinch the noose tight around the button as shown in FIG. 3. The resulting shackle has a flush fit, with no protrusions, with a strength that meets or exceeds the strength of the rope.

It is contemplated that at least one use of the present arrangement is for use in creating integrated soft shackles for sailing rigging, but many other uses are contemplated, including, but not limited to, off road vehicle winch cables and recovery ropes and straps, as well as replacement for equestrian knots and leads for items such as holsters. The integrated soft shackle can also be used in camping, fishing, climbing, and fire and rescue fields.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A rope with an integrated soft shackle at one end, said integrated soft shackle comprising:
   a notched button and having an oval opening, said notched button and said oval opening forming a bar therebetween between,
   wherein the rope has two loops which circle the bar fixing said notched button to said rope, said rope further comprising a noose that can slip over the notched button completing a cinched loop of said integrated soft shackle at an end of the rope.

2. The rope with the integrated soft shackle of claim 1, wherein a ratio of a cross section of the bar to a cross sectional area of the rope is substantially between about 2 and about 3.5.

3. The rope with the integrated soft shackle of claim 1, wherein a ratio of a contact surface area of the bar to a contact surface area of the rope is no less than 1.25, and not greater than 3.25.

4. The rope with the integrated soft shackle of claim 3, wherein the button is made of aerospace grade aluminium.

5. A method of making the soft shackle with said notched button and said rope as claimed in claim 1, wherein said method comprising the steps of:

making a first loop of said two loops in a rope such that the first loop fits around a bar formed between a notch and oval opening of a notched button, making a noose in the rope that can cinch around the notched button, making a second loop of said two loops that fits around the bar, and splicing an end of the rope back into the rope.

6. A method of using the soft shackle with the rope having the notched button attached thereto, as claimed in claim 1, with a noose at the end of the rope, said method comprising the steps of:

opening the noose wide enough to slip over the notched button, placing the noose over the notched button, and cinching the noose tight around the notched button.

\* \* \* \* \*